(12) United States Patent
Kim

(10) Patent No.: US 7,213,663 B2
(45) Date of Patent: May 8, 2007

(54) DRIVING DEVICE FOR ROBOT CLEANER

(75) Inventor: Ki-man Kim, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 141 days.

(21) Appl. No.: 10/804,077

(22) Filed: Mar. 19, 2004

(65) Prior Publication Data
US 2004/0262060 A1    Dec. 30, 2004

(30) Foreign Application Priority Data
Jun. 30, 2003    (KR) .................. 10-2003-0043244

(51) Int. Cl.
*B62D 11/04*    (2006.01)
(52) U.S. Cl. ....................... 180/6.5; 180/251
(58) Field of Classification Search ............... 180/6.48, 180/6.5, 251, 65.5, 6.2, 24.01, 24.02, 24.11, 180/24.12, 24.13, 341, 357, 366, 167
See application file for complete search history.

(56) References Cited

U.S. PATENT DOCUMENTS

| | | | |
|---|---|---|---|
| 2,284,790 A * | 6/1942 | Allin .......................... | 180/251 |
| 4,119,163 A * | 10/1978 | Ball ........................... | 180/6.5 |
| 4,306,329 A * | 12/1981 | Yokoi ......................... | 15/319 |
| 4,540,376 A * | 9/1985 | Turbowitz et al. ........... | 446/164 |
| 4,572,311 A * | 2/1986 | Oswald et al. ............... | 180/6.48 |
| 4,729,444 A * | 3/1988 | Tubman ...................... | 180/9.22 |
| 5,023,444 A | 6/1991 | Ohman | |
| 5,819,863 A * | 10/1998 | Zollinger et al. ............. | 180/6.5 |
| 6,357,076 B1 | 3/2002 | Lee | |
| 2002/0153184 A1 | 10/2002 | Song et al. | |
| 2002/0153185 A1 | 10/2002 | Song et al. | |
| 2004/0195012 A1 * | 10/2004 | Song et al. ................... | 180/6.5 |

FOREIGN PATENT DOCUMENTS

| | | | |
|---|---|---|---|
| CN | 1401289 A | | 3/2003 |
| JP | 63121514 | * | 5/1988 |
| JP | 04-026407 A | | 1/1992 |
| JP | 2003-033310 | | 2/2003 |
| KR | 1020020081512 A | | 10/2002 |
| NL | 86232 | | 4/1957 |
| NL | 6711520 | | 2/1969 |
| WO | WO 02/067744 | | 6/2002 |

OTHER PUBLICATIONS

Official Action issued Feb. 11, 2005 from the Korean Intellectual Property Office with respect to Korean Application No. 2003-43244 filed on Jun. 30, 2003.
Combined Search and Examination Report from United Kingdom, dated Sep. 27, 2004.
Russian Patent Office, Official Action dated Apr. 29, 2005 with respect to Russian Patent Application No. 2004113032 filed on Apr. 27, 2004.
Chinese Patent Office, Office Action dated Dec. 16, 2005, with respect to Chinese Patent Application No. 200410032126.3 filed on Apr. 1, 2004.

* cited by examiner

*Primary Examiner*—Anne Marie Boehler
(74) *Attorney, Agent, or Firm*—Blank Rome, LLP.

(57) ABSTRACT

A driving device of a robot cleaner with a shock-absorbing unit. The driving device includes a robot cleaner body and a pair of motors disposed in the robot cleaner body which are driven by respective power supplies. The driving device also includes a pair of driving wheels rotated by the pair of motors, a pair of driven wheels following the pair of driving wheels, and a driving force transmitting means which causes the driving wheels and the driven wheels to move in association with each other. A frame unit is disposed in the robot cleaner body to support the pair of driving wheels and the pair of driven wheels, and a shock-absorbing unit is disposed in the frame unit to absorb shock that occurs from a cleaning surface.

12 Claims, 4 Drawing Sheets

DRIVING DEVICE FOR ROBOT CLEANER

REFERENCE TO RELATED APPLICATION

This application claims priority to copending Korean Patent Application No. 2003-43244 filed on Jun. 30, 2003, in the Korean Intellectual Property Office, the disclosure of which is incorporated herein by reference in its entirety Field of the Invention

CROSS-REFERENCE TO RELATED APPLICATIONS

This application is related to copending Korean patent Application Nos. 10-2003-0007426, filed Feb. 6, 2003; 10-2003-0013961, filed Mar. 6, 2003; 10-2003-0029242, filed May 9, 2003; and 10-2003-0050904, filed Jul. 24, 2003, whose disclosures are entirely incorporated herein by reference.

FIELD OF THE INVENTION

The present invention relates to a driving device for a robot cleaner, and more particularly, to a driving device for a robot cleaner having a shock-absorbing unit, which allows the robot cleaner to smoothly go over an obstacle such as a carpet or a doorsill during a cleaning.

BACKGROUND OF THE INVENTION

Despite frequent uses of a vacuum cleaner in household affairs, vacuum cleaning remains exhausting housework because a user has to directly manipulate the vacuum cleaner for a variety of cleanings. In order to solve that problem, a robot cleaner was developed so that the robot cleaner was capable of traveling and automatically cleaning without manipulation by an external device. Recently, in addition to that function, a robot cleaner was developed to indulge the functions of sterilizing bacteria and purifying air at home.

FIG. 1 is a perspective view showing a conventional robot cleaner in which a cover is removed.

Referring to FIG. 1, a robot cleaner 10 includes a suction part 11 disposed on a body 10a, a sensor part 12, a front camera 13, an upper camera 14, a driving device 15, a transmitting/receiving part 17, a controller 18, and a battery 19. The suction part 11 is disposed on the body 10a to draw in dust-ladened air from a cleaning surface opposing thereto. The suction part 11 has a well-known construction, for example, the suction part 11 includes a suction motor (not shown) and a dust-collecting chamber for collecting dust which is drawn-in by the suction motor through a suction port or a suction pipe opposed to the cleaning surface. The sensor part 12 includes an obstacle sensor 12a arranged along a circumference of a body of the sensor part 12 at a predetermined interval to transmit signals to the outside and receive a reflected signal, and, a traveling distance sensor 12b measuring a traveling distance of the robot cleaner 10. The front camera 13 is disposed on the body 10a to photograph front images and output the photographed images to the controller 18. The upper camera 14 is disposed on the body 10a to photograph the upward images and output the photographed images to the controller 18. The front and upper cameras 13, 14 are optional. The driving device 15 includes two driven wheels 15a and 15b disposed at both front sides, two driving wheels 15c and 15d disposed at both rear sides, motors 15e and 15f rotationally driving the two rear driving wheels 15c and 15d, respectively, and a timing belt 15g transmitting a driving force from the two rear driving wheels 15c and 15d to the two front driven wheels 15a and 15b. The driving device 15 rotates the respective motors 15e and 15f independently in clockwise/counter-clockwise directions in accordance with a control signal of the controller 18. The change of the direction of the robot cleaner is made by rotating the motors 15e and 15f at different RPMs.

The controller 18 processes the signals received by the transmitting/receiving part 17 and controls the respective components accordingly. The robot cleaner 10 may further comprise a key input apparatus (not shown). In this case, the key input apparatus (not shown) may be formed in the body 10a and includes a plurality of keys for manipulating a function setting of the robot cleaner 10, and, the controller 18 processes a key signal inputted through the key input apparatus (not shown).

The battery 19 is disposed on the body 10a and is recharged with power through a battery recharging power terminal (not shown) disposed outside the body 10a, and is connected and disconnected to and from an external recharging apparatus (not shown).

The robot cleaner 120 transmits the images photographed by the front and the upper cameras 13 and 14 to the outside, wirelessly. The robot cleaner 120 operates according to the control signal received from the outside.

When the driving device 15 rotates the respective motors 15e and 15f in the same direction, the two driving wheels 15c and 15d and the two driven wheels 15a and 15b are rotated in the same direction, thus moving a cleaner body 100 in a linear direction.

When the motors 15e and 15f are rotated in different directions, the two driving wheels 15c and 15d and the two driven wheels 15a and 15b are rotated in opposite directions, which also moves the cleaner body 100 in a rotating direction. When an obstacle such as a doorsill or a carpet is in front of the robot cleaner 10, the driving device 15 of the conventional robot cleaner 10 rotates the two driving wheels 15c and 15d and the two driven wheels 15a and 15b in different directions to avoid the obstacle. However, sometimes, the user wants the robot cleaner 10 to go over the obstacle and to clean a place over the obstacle, but the conventional robot cleaner was not able to do so because it normally veers away upon sensing the obstacle ahead. If the user pulls the robot cleaner 10 over the obstacle, noises occur and shock frequently occurs, causing the durability of the robot cleaner to deteriorate.

Thus, a heretofore unaddressed need exists in the industry to address the aforementioned deficiencies and inadequacies.

SUMMARY OF THE INVENTION

The present invention addresses the above problems in the related art. An aspect of the present invention provides a robot cleaner with a driving device that allows the robot cleaner to smoothly go over an obstacle such as a carpet or a doorsill. Another aspect of the present invention provides a robot cleaner traveling smoothly across a cleaning area without making a noise by absorbing shock occurring when the robot cleaner goes over the obstacle.

The above aspects are achieved by providing a driving device of a robot cleaner comprising a robot cleaner body, a pair of motors disposed in the robot cleaner body which are driven by respective power supplies, a pair of driving wheels rotated by the pair of motors, and a pair of driven wheels following the pair of driving wheels. The driving device further includes a driving force transmitting means which causes the driving wheels and the driven wheels to move in association with each other, a frame unit disposed in the robot cleaner body to support the pair of driving wheels and the pair of driven wheels, and a shock-absorbing unit disposed in the frame unit to absorb shock occurring from a cleaning surface. In one embodiment, the driving force transmitting means is a timing belt and the frame unit is provided with motor covers, each motor cover extended from the frame unit in an axial direction of the motor.

The shock-absorbing unit includes an upper supporting member, a lower supporting member corresponding to the upper supporting member, an elastic member disposed between the upper supporting member and the lower supporting member, and a unit shaft penetrating through the upper supporting member, the elastic member, and the lower supporting member.

In another embodiment, the elastic member is a coil spring and the frame unit comprises an upper cover, a first lower cover disposed at the upper cover, and a second lower cover connected to the first lower cover and disposed at the upper cover. The upper cover may further comprise a supporting member for supporting the shock-absorbing unit and an opening formed in the supporting member. Also, the first lower cover includes a protrusion formed in a side thereof, and, the upper cover has a recess formed therein to allow the protrusion to pivot therein about an axis of the driving wheels. The recess may be shaped in an arc.

In yet another embodiment, the upper cover is securely disposed at the robot cleaner body and the shock-absorbing unit is disposed between the upper cover and the first and the second lower cover. The shock-absorbing unit pivots about the axis of the driving wheels together with the driven wheels according to a condition of the cleaning surface.

In another embodiment, the motors are directly connected to the driving wheels which move the robot cleaner body and the driving wheels, and the driven wheels have saw-serrated outer circumferences.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWING FIGURES

The above aspects and other features of the present invention will be described in greater detail with reference to the accompanying drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Hereinafter, the present invention will be described in more detail with reference to the accompanying drawings.

Figure 1:
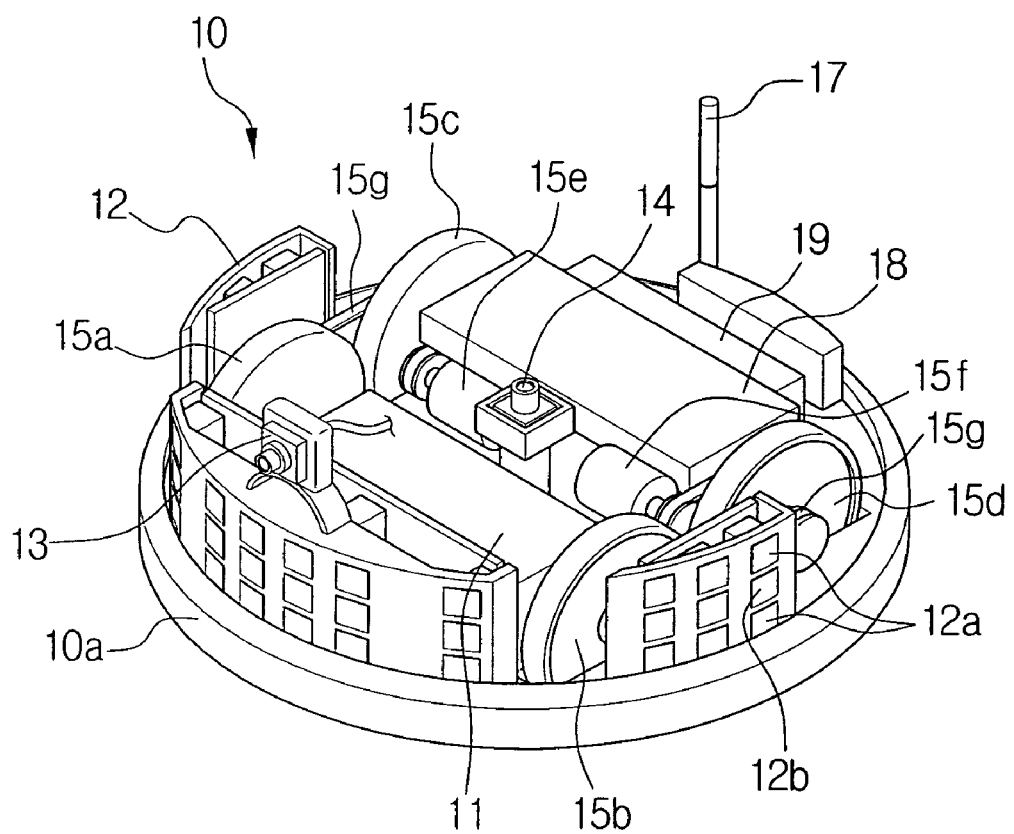
FIG. 1 is a drawing showing a perspective view of a conventional robot cleaner in which a cover is removed.

The robot cleaner 100 with the driving device according to the present invention has the same construction as the general robot cleaner 10 shown in FIG. 1. The robot cleaner 100 includes a suction part 11 disposed on a body 10a, a sensor part 12, a front camera 13, an upper camera 14, a driving device 15, a transmitting/receiving part 17, a controller 18, and a battery 19. Since the construction and operation of the robot cleaner 100 is similar to those of the robot cleaner 10 of FIG. 1, descriptions thereof are omitted.

Figure 2:
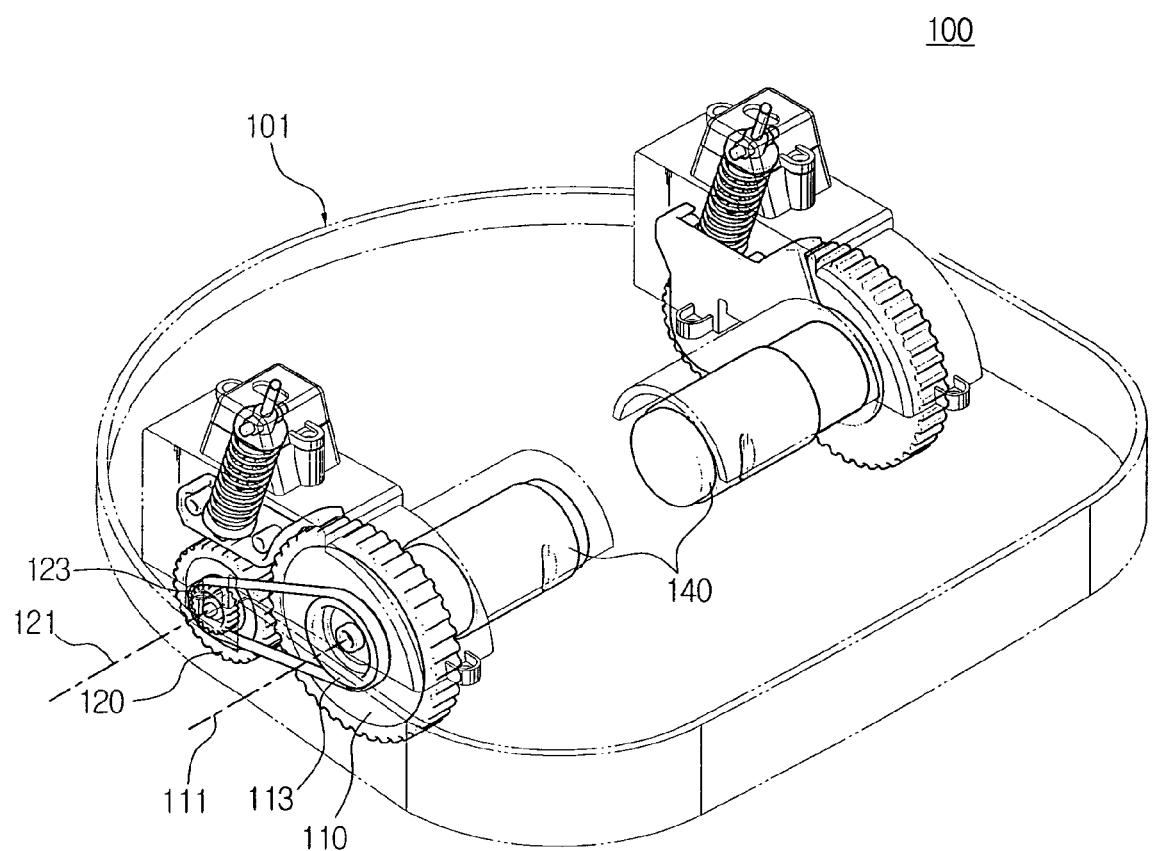
FIG. 2 is a drawing showing a perspective view of a driving device of a robot cleaner according to an embodiment of the present invention.
Figure 3:
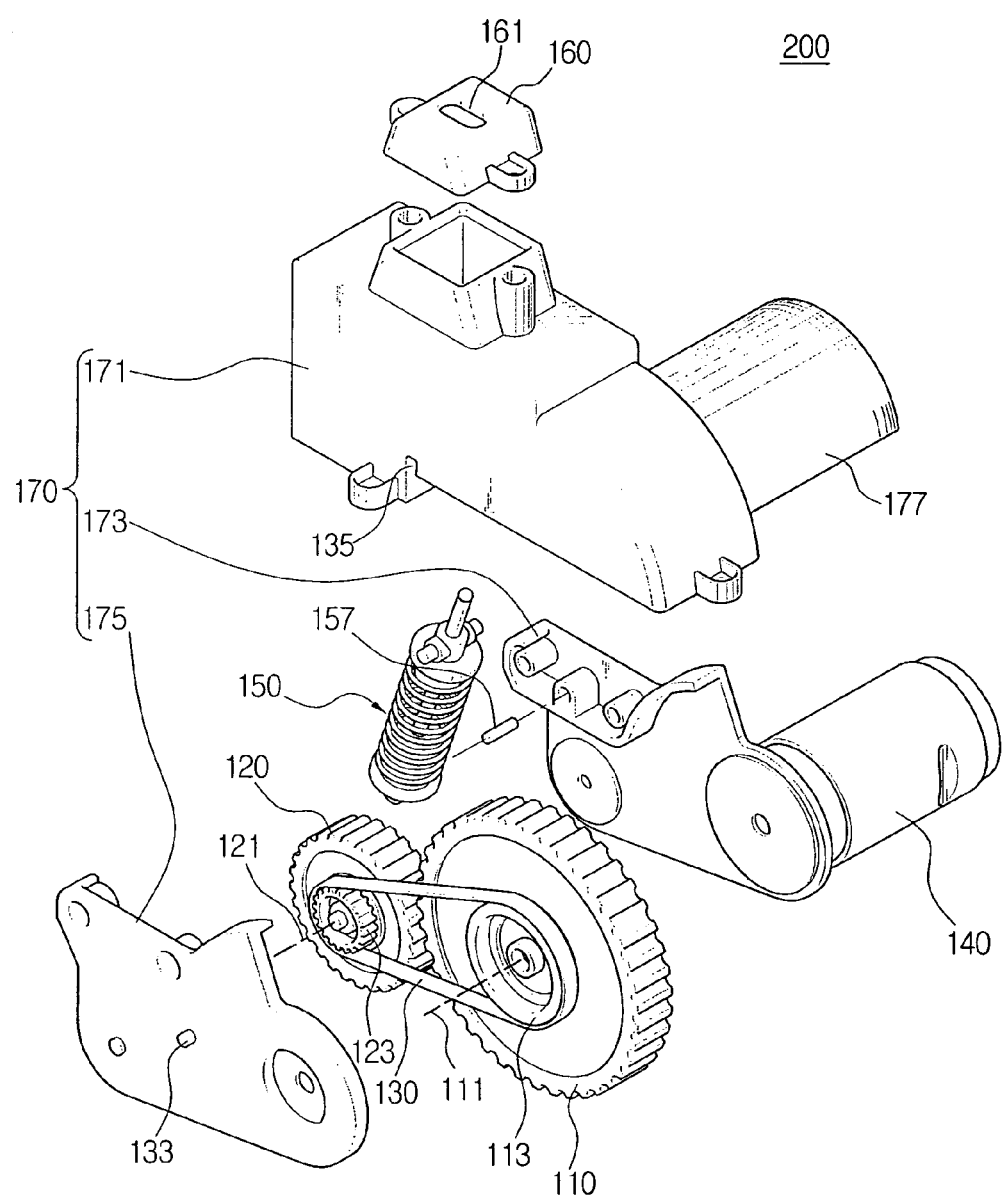
FIG. 3 is a drawing showing an exploded perspective view of the driving device of the robot cleaner according to the embodiment of the present invention.

Referring to FIGS. 2 and 3, the driving device of the robot cleaner 100 includes a robot cleaner body 101, a pair of motors 140, a pair of driving wheels 110, a pair of driven wheels 120, driving force transmitting means 130, a frame unit 170, and a shock-absorbing unit 150. The pair of driving wheels 110 support the robot cleaner body 101 with respect to a cleaning surface, and, the pair of motors 140 are secured to the robot cleaner body 101 and are rotated in a clockwise direction or a counter-clockwise direction, independently, by a power supply. Also, driving axes 111 are coaxially connected to the pair of motors 140 and are rotated in a clockwise direction or a counter-clockwise direction by the rotation of the pair of motors 140. The driving axes 111 protrude from the driving wheels 110 and are connected to driving pulleys 113 at their respective ends.

The pair of driven wheels 120 are connected to the robot cleaner body 101 through driven axes 121. Each driven wheel 120 is rotated in association with the driving wheel 110 and is disposed at a same side thereof. The driven axes 121 also protrude from the driven wheels 120 to the outside and are connected to the driven pulleys 123.

The driving force transmitting means 130 transmits a driving force which is transmitted from the pair of motors 140 to the pair of driving wheels 110, to the driven wheels 120. The driving force transmitting means 130 includes a timing belt disposed on the driving wheels 110 and the driven wheels 120. The timing belt connects the driving wheels 110 and the driven wheels 120 via the pulleys 113 and 123, wherein the axes 111 and 121 do not protrude from the driving wheels 110 and the driven wheels 120 to the outside, and are connected to the pulleys 113 and 123. Also, the timing belt may be directly disposed on the exposed parts of the axes 111 and 121 without using the pulleys 113 and 123, and in such a case, a separation preventing means (not shown) is further provided to prevent the timing belt from separating from the axis 111 and 121.

The frame unit 170 includes an upper cover 171, a first lower cover 175 disposed at the upper cover 171, and a second lower cover 173 connected to the first lower cover 175 and disposed at the upper cover 171. The frame unit 170 supports the driving wheels 110 and the driven wheels 120 and is disposed in the robot cleaner body 101. The upper cover 171 is provided with a motor cover 177 extending from the upper cover 171 along an axial direction of the motor 140 and covering over the external circumference of the motor 140. The frame unit 170 may be made of a light-weight material such as a plastic. The upper cover 171 is provided also with a supporting member 160 for supporting the shock-absorbing unit 150. The supporting member 160 has an opening 161 formed therein. The shock-absorbing unit 150 is secured to the upper cover 171 of the frame unit 170 and absorbs the shock. The first lower cover 175 has a protrusion 133 formed in one side surface thereof. The upper cover 171 has a recess 135 to allow the protrusion 133 to pivot therein about the axis of the driving wheels 110. The recess 135 corresponds to the protrusion 133 and is shaped in an arc.

Accordingly, when an obstacle lies in front of the robot cleaner 100, the first lower cover 175 and the second lower cover 173 pivot about the axis 111 of the driving wheel 110 together with the driven wheels 120. The pivotal movement of the driven wheel 120 is confined to a depth of the recess 135 of the upper cover 171. The upper cover 171 is secured to the robot cleaner body 101. The shock-absorbing unit 150 is disposed between the upper cover 171 and the first and the second lower covers 175 and 173.

When the obstacle lies in front of the robot cleaner 100, the driven wheels 120 pivot upwardly about the axis 111 of the driving wheels 110, and, due to the upward movement of the driven wheels 120, the shock-absorbing unit 150 performs the shock-absorbing function. As the robot cleaner 100 goes over the obstacle, the driven wheels 120 move downwardly to a cleaning surface opposing thereto. Accordingly, the shock-absorbing unit 150 absorbs noise and shock which occur by the robot cleaner 100 landing on the cleaning surface.

The motors 140 are directly connected to the driving wheels 110 for moving the robot cleaner body 101. Instead of the driving motors 140 employed herein, motors having gear pulleys can be used.

The driving wheels 110 and the driven wheels 120 have saw-serrated outer circumferences, so that when the robot cleaner 100 bumps into the obstacle, or when the robot cleaner 100 contacts with the cleaning surface, a contact force increases, and the robot cleaner 100 moves over the obstacle or runs on the cleaning surface stably without a slip.

Figure 4:
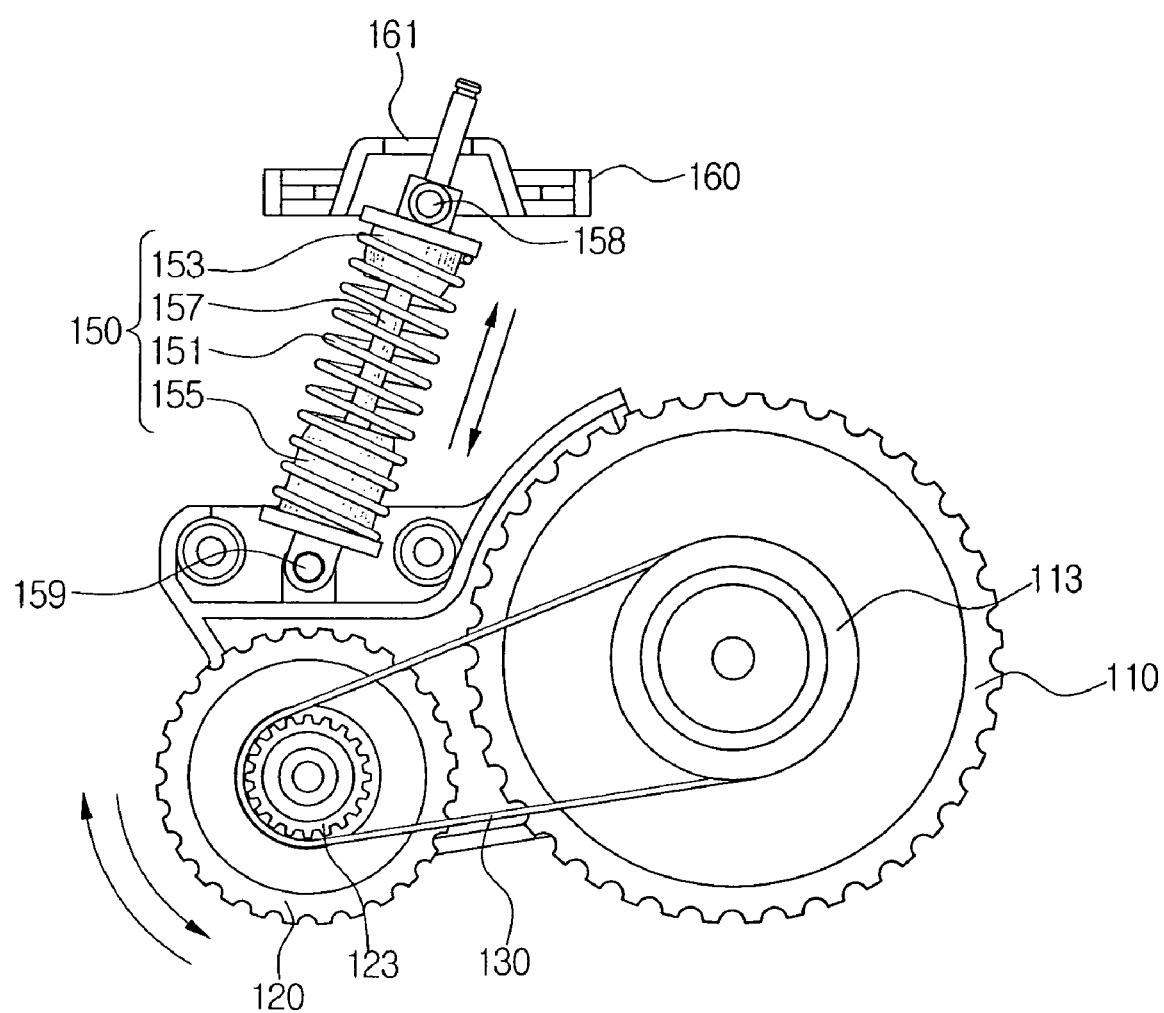
FIG. 4 is a drawing showing a side elevation view of the driving device of the robot cleaner according to the present invention.

FIG. 4 is a side view showing the main parts of the driving device of the robot cleaner 100 according to a preferred embodiment of the present invention. Hereinafter, the shock-absorbing unit 150 is described with reference to FIG. 4. The shock-absorbing unit 150 is disposed in the frame unit 170 to absorb the shock occurring when the robot cleaner 100 collides with the cleaning surface. The shock-absorbing unit 150 includes an upper supporting member 153, a lower supporting member 155 corresponding to the upper supporting member 153, an elastic member 151 disposed between the upper supporting member 153 and the lower supporting member 155. A unit shaft 157 penetrates through the elastic member 151, the upper supporting member 153, and the lower supporting member 155. In another embodiment, the elastic member 151 is a coil spring.

Following, is a description of the operation of the driving device 100 of the robot cleaner 100 with the shock-absorbing unit 150 constructed as above. As shown in FIGS. 2 through 4, when the driving device 200 drives the pair of motors 140 in the same direction, the driving wheels 110 rotate in the same direction, and accordingly, the driven wheels 110 receive the driving force through the timing belts 130. As a result, the robot cleaner body 101 moves to desired locations by advancing or retreating.

When the pair of motors 140 are driven in different directions, the driving wheels are rotated in different directions. In the same manner as above, the driven wheels 120 receiving the driving force through the timing belts 130, follow the driving wheels 110 to rotate the robot cleaner body 101. If an obstacle such as a doorsill or carpet is in front of the robot cleaner 100, the driven wheels 120 pivot upwardly about the driving axis 111 of the driving wheels 110, and the shock-absorbing unit 150 performs the shock-absorbing function. As the robot cleaner 100 goes over the obstacle, the driven wheels 120 pivot downwardly to the opposing cleaning surface so that the shock-absorbing unit 150 absorbs the noise and the shock which occur by the landing of the robot cleaner 100 on the cleaning surface.

The first lower cover 175 and the second lower cover 173 support the movements of the driven wheels 120, and the shock-absorbing unit 150 disposed in the frame unit 170.

The driven wheels 120 move upwardly or downwardly together with the first lower cover 175 and the second lower cover 173 thereby allowing the robot cleaner 100 to go over the obstacle smoothly. Also, since the shock is absorbed, the robot cleaner 100 goes over the obstacle smoothly, which causes the noise and the shock to be reduced.

As described above, when the obstacle such as a carpet or a doorsill is placed in front of the robot cleaner 100, since the driving device 200 allows the robot cleaner 100 to go over the obstacle smoothly, and as the noise and shock are absorbed, a user is less inconvenienced.

The foregoing embodiment and advantages are merely exemplary and are not to be construed as limiting the present invention. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A driving device of a robot cleaner comprising:
   a robot cleaner body;
   a pair of motors disposed in the robot cleaner body and driven by respective power supplies;
   a pair of driving wheels rotating by the pair of motors;
   a pair of driven wheels following the pair of driving wheels;
   a driving force transmitting means causing the driving wheels and the driven wheels to move in association with each other;
   a frame unit disposed in the robot cleaner body to support the pair of driving wheels and the pair of driven wheels; and
   a shock-absorbing unit disposed in the frame unit to absorb shock occurring from a cleaning surface, the shock-absorbing unit comprising:
   an upper supporting member,
   a lower supporting member corresponding to the upper supporting member, and
   an elastic member disposed between the upper supporting member and the lower supporting member;
   wherein the shock-absorbing unit further comprises a unit shaft penetrating through the upper supporting member, the elastic member, and the lower supporting member.

2. The driving device as claimed in claim 1, wherein the driving force transmitting means is a timing belt.

3. The driving device as claimed in claim 1, wherein the frame unit is provided with motor covers, each motor cover being extended from the frame unit in an axial direction of the motor.

4. The driving device as claimed in claim 1, wherein the elastic member is a coil spring.

5. The driving device as claimed in claim 1, wherein the frame unit comprises:
- an upper cover;
- a first lower cover disposed at the upper cover; and
- a second lower cover connected to the first lower cover and disposed at the upper cover.

6. The driving device as claimed in claim 5, wherein the upper cover is securely disposed at the robot cleaner body.

7. The driving device as claimed in claim 1, wherein the motors are directly connected to the driving wheels which moves the robot cleaner body.

8. The driving device as claimed in claim 1, wherein the driving wheels and the driven wheels have saw-serrated outer circumferences, respectively.

9. A driving device of a robot cleaner comprising:
- a robot cleaner body;
- a pair of motors disposed in the robot cleaner body and driven by respective power supplies;
- a pair of driving wheels rotating by the pair of motors;
- a pair of driven wheels following the pair of driving wheels;
- a driving force transmitting means causing the driving wheels and the driven wheels to move in association with each other;
- a frame unit disposed in the robot cleaner body to support the pair of driving wheels and the pair of driven wheels; and
- a shock-absorbing unit disposed in the frame unit to absorb shock occurring from a cleaning surface;

wherein the frame unit comprises:
- an upper cover;
- a first lower cover disposed at the upper cover; and
- a second lower cover connected to the first lower cover and disposed at the upper cover; and wherein the upper cover further comprises a supporting member for supporting the shock-absorbing unit, and an opening is formed in the supporting member.

10. A driving device of a robot cleaner comprising:
- a robot cleaner body;
- a pair of motors disposed in the robot cleaner body and driven by respective power supplies;
- a pair of driving wheels rotating by the pair of motors;
- a pair of driven wheels following the pair of driving wheels;
- a driving force transmitting means causing the driving wheels and the driven wheels to move in association with each other;
- a frame unit disposed in the robot cleaner body to support the pair of driving wheels and the pair of driven wheels; and
- a shock-absorbing unit disposed in the frame unit to absorb shock occurring from a cleaning surface;

wherein the frame unit comprises:

an upper cover;

a first lower cover disposed at the upper cover; and a second lower cover connected to the first lower cover and disposed at the upper cover; and wherein the first lower cover has a protrusion formed in a side thereof, and the upper cover has a recess formed therein to allow the protrusion to pivot therein about an axis of the driving wheels.

11. The driving device as claimed in claim 10, wherein the recess is shaped in an arc.

12. A driving device of a robot cleaner comprising:

a robot cleaner body;

a pair of motors disposed in the robot cleaner body and driven by respective power supplies;

a pair of driving wheels rotating by the pair of motors;

a pair of driven wheels following the pair of driving wheels;

a driving force transmitting means causing the driving wheels and the driven wheels to move in association with each other;

a frame unit disposed in the robot cleaner body to support the pair of driving wheels and the pair of driven wheels; and a shock-absorbing unit disposed in the frame unit to absorb shock occurring from a cleaning surface;

wherein the frame unit comprises:

an upper cover;

a first lower cover disposed at the upper cover; and a second lower cover connected to the first lower cover and disposed at the upper cover; and wherein the shock-absorbing unit is disposed between the upper cover and the first and the second lower cover and pivots about the axis of the driving wheels together with the driven wheels according a condition of the cleaning surface.

* * * * *